Dec. 26, 1967    R. S. CATALDO    3,359,719

FREE PISTON-PULSED TURBINE ENGINE

Filed Jan. 14, 1966

INVENTOR.
Roy S. Cataldo
BY
F. J. Fodale
ATTORNEY

United States Patent Office 3,359,719
Patented Dec. 26, 1967

3,359,719
FREE PISTON-PULSED TURBINE ENGINE
Roy S. Cataldo, Birmingham, Mich., assignor to General Motors Corporation, Detroit, Mich., a corporation of Delaware
Filed Jan. 14, 1966, Ser. No. 520,697
5 Claims. (Cl. 60—13)

My invention relates to a gas producing unit of the type in which combustion takes place in an enclosed space and the gaseous products of combustion are periodically discharged at high temperature and under pulsating pressures to drive a turbine or other machine operated by the expansion of the gaseous products. Included in such types of units are two-stroke cycle internal combustion engines provided with an exhaust gas driven turbo-charger and power turbines energized by gas generators of the free piston or crankshaft type. More particularly, the invention relates to improvements in the exhaust systems of such units.

The conditions of the gas supplied to a turbine affect its efficiency of operation, because it is designed to work with an expansion ratio which is substantially constant. Thus, to convert the potential energy in a gas flow into mechanical energy in the turbine shaft with maximum efficiency, the pressure drop across the turbine and the mass flow through the turbine must be substantially constant during those periods during which the potential energy is being extracted. This condition holds true for both continuous flow and pulsating flow. For, in pulsating flow, even though intermittent, the energy is still being converted under ideal conditions, that is, under constant pressure and mass flow. What happens between the pulses is immaterial since no energy is being put into the system.

In the prior art pulsating systems, a mixing process was included in order to lower the gas temperature to a level acceptable to the turbine thermal limits. The mixing process was also utilized to transform the pulsating stream into a continuous flow at constant pressure. This increased the turbine efficiency but reduced the overall efficiency because of the entropy change and thermal efficiency loss associated with the mixing process. In my improved exhaust system, I propose to eliminate the mixing process and at the same time improve turbine efficiency by applying the gas pulses at constant pressure and mass flow during the discharge periods.

The gas flow to the turbine will thus be in a square wave form, i.e., constant pressure and flow during discharge from the gasifier cycle. This square wave flow enables me to save the mixing loss because the gas is converted into mechanical energy at a higher temperature. The turbine thermal limit will allow this overtemperature because of the intermittent operation; that is, the hot gases during gasifier discharge and cool gases during the remainder of the cycle average out to a temperature acceptable to the turbine.

Accordingly, the invention is broadly directed to harnessing a high proportion of the energy of the pulsating gas flow and to delivering the gases to the turbine at more nearly constant pressure and mass flow.

My invention consists in a gas producing unit comprising at least one combustion chamber having controlled exhaust orifices that open and close in sequence at predetermined points in the cycle of operations of the unit and from which the gaseous products of combustion are discharged periodically at high temperature and under pressure, thus producing successive pulses of gases, a gas driven turbine, and an exhaust sysem designed to apply these successive pulses of gases at a relatively constant pressure and mass flow during the gasifier discharge periods. This exhaust system thus presents the potential energy in the gas stream to the turbine for conversions into mechanical energy at maximum efficiency. In addition, the pulsed mode of operation allows a higher turbine inlet temperature for the hot gas pulses since the temperature when averaged over the whole gasifier cycle gives an operating temperature within present day temperature limits. Thus the hot pulses have more utilizable energy which together with the improved turbine efficiency due to the square wave form results in a combination which has an overall efficiency as good as or better than the constant flow type of operation which is characterized by better turbine efficiency but less utilizable energy in the gas stream.

More specifically then, my invention is directed toward providing an exhaust system for transforming successive pulses of gases into a square wave form so that the hot gasifier discharge gases are applied to the turbine at substantially constant mass flow and pressure. The system allows a higher turbine inlet temperature (and thus more utilizable energy) during the hot pulses because the average temperature can be maintained within limits. The higher inlet temperature together with the increased turbine efficiency due to the square wave flow gives an improved overall pulsating flow system.

With these and other objects in view, as will hereinafter more fully appear, and which will be more particularly pointed out in the appended claims, reference is now made to the following description taken in connection with the accompanying drawings in which:

Figure 1:
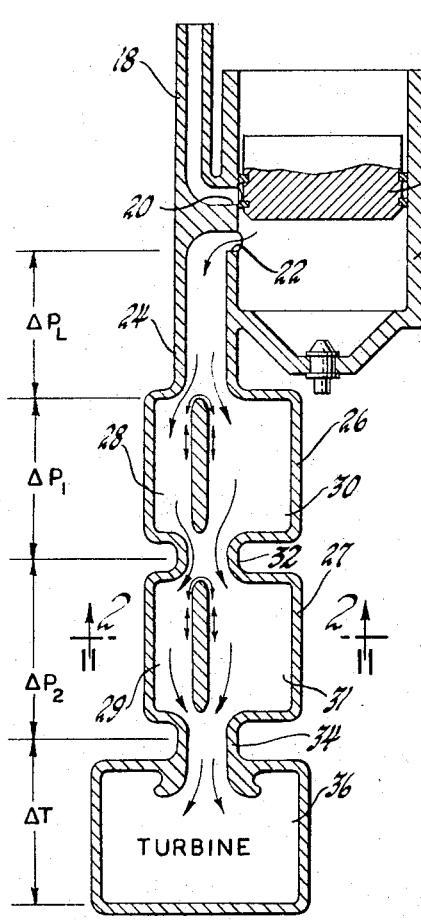
FIGURE 1 is a diagrammatic representation of an exhaust system in accordance with my invention as applied between a single cylinder two stroke engine and a turbine.
Figure 3:
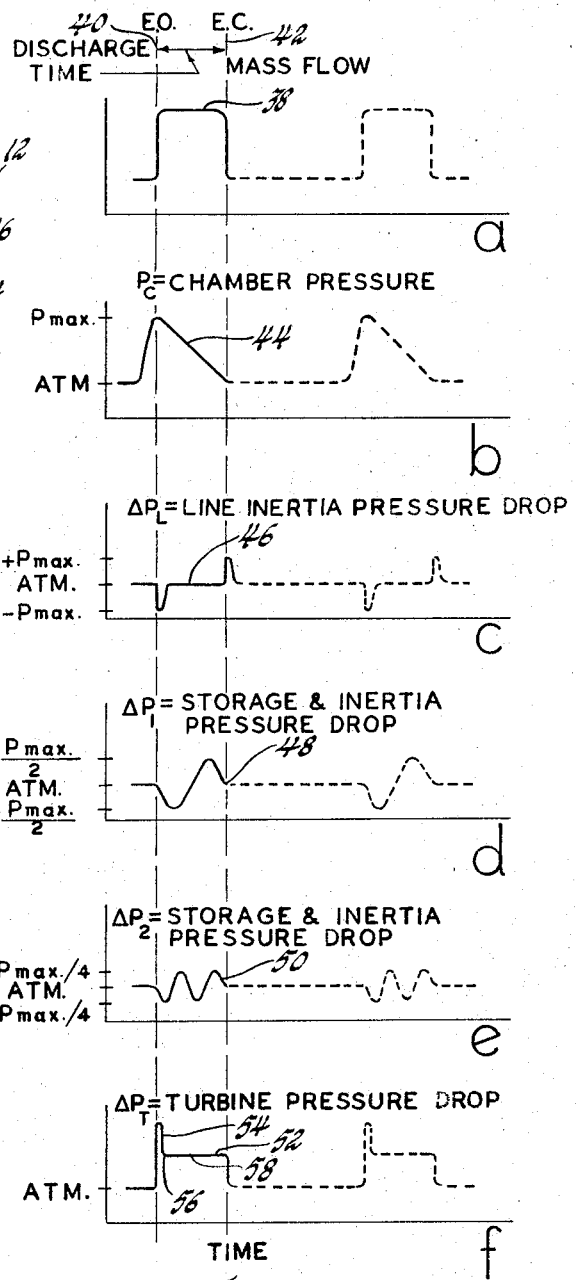

FIGURE 3 indicates the pressure variation at various points in the system shown in FIGURE 1.

Figure 2:
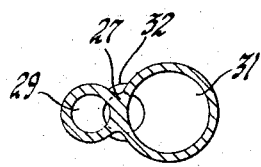
FIGURE 2 is a section view taken along the line 2—2 of FIGURE 1 and looking in the direction of the arrows.

Referring now more specifically to the drawings and in particular FIGURE 1, I have shown a single cylinder two stroke engine 12 comprising a cylinder 14 with a piston 16 reciprocably mounted in it. Conduit 18 communicates with the cylinder 14 through an inlet 20 while the hole 22 provides the outlet or exhaust to the line 24. The line 24 is a part of my exhaust system which also includes two serially arranged elements 26 and 27. Element 26 consists of an inertia conduit 28 and a storage conduit 30 of larger diameter (FIGURE 2) in a parallel flow relationship. The inertia conduit of element 27 is indicated at 29 and its storage element at 31. Elements 26 and 27 are connected by a short length of conduit 32 while a short conduit 34 connects element 27 to a turbine shown diagrammatically at 36.

Having thus physically described the exhaust system in connection with a single cylinder two stroke engine and a gas driven turbine, I will now described its operation in connection with FIGURE 3.

In general, FIGURE 3 shows the mass flow, gasifier chamber pressure and pressure drops across the various elements of my exhaust system as shown in FIGURE 1 during the cycle of the gasifier.

More specifically, FIGURE 3a shows the mass flow during the gasifier cycle. Recall that my object or the basis of my design is to ideally apply a constant mass flow to the turbine 36 from the gasifier chamber 14 during the discharge time of the gasifier. This intermittent constant flow condition is shown by the square wave 38, the discharge time being indicated as the elapsed time between the exhaust opening, E.O., and the exhaust closing, E.C., of the exhaust 22 by the piston 16. The E.O. and E.C. points in the gasifier cycle are indicated directly in FIGURE 3a and indirectly in the remaining sub figures of FIGURE 3 by the vertical dashed lines 40 and 42. Having thus set out our objective, that is, square wave mass flow, let us examine the pressure drops across the elements resulting from our assumed mass flow. If these pressure drops can be produced in the various elements, then our mass flow must be as assumed.

Turning our attention to FIGURE 3b, the chamber pressure is shown by the curve 44. Just prior to the exhaust opening, the charge in the gasifier chamber 14 is ignited and the chamber pressure increases. When the exhaust opens, the chamber pressure is at some value which we will define as maximum chamber exhaust pressure, $P_{max}$. As shown in the graph, the exhaust opens at a pressure which is also the maximum chamber pressure but it is to be understood that the exhaust may open at some value less than maximum chamber pressure depending on the thermodynamic cycle of the particular gasifier. Because the chamber volume is substantially constant during exhaust, it acts substantially as a constant storage effect. The chamber being a constant storage effect and having assumed a constant mass flow, the chamber pressure then decreases linearly from maximum chamber exhaust pressure, $P_{max}$, to atmospheric pressure.

The effect of the constant mass flow and the linear pressure drop of the chamber 14 on the line 24 is shown in FIGURE 3c. The line 24 is essentially an acoustic inertia element. Physically, it is simply an open tube. It can be described best by its results, that is, the mass flow through it will act as an inertia. It can be designed primarily by selecting the proper length to diameter ratio for the conduit which depends on the physical characteristics of the gasifier cycle and discharge time which varies for each gasifier. Suffice it to say, that the inertia line must be designed for a specific gasifier and its shape determined experimentally. This technique is well-known and practiced in the acoustical arts.

The lline inertia pressure drop is shown at 46. As the exhaust opens (E.O.), the mass flow is not instantaneous because of the inertia of the gas. Since the chamber pressure is at $P_{max}$ and since there is no flow instantaneously, there must be a pressure which opposes the flow. This pressure must be equal and opposite to the chamber pressure $P_{max}$. This opposition pressure, I have indicated by a negative pressure drop across the line 24 at the exhaust opening time of the cycle. Similarly, a positive pressure drop just before the exhaust closes and reduces the flow to zero.

FIGURE 3d shows the pressure drop across the first storage and inertia element 26. The element 26 is an inertia line or open conduit 28 in a series flow relationship with a storage element 30. The storage 30 is shown as a volume which is larger than the line inertia 28. By properly selecting the relationship between the line volume and the storage volume, the element can be made to act as an acoustical resonator so that it will experience a sinusoidal pressure profile when excited by a step change in mass flow. This is roughly analogous to the sinusoidal voltage output of a capacitor and inductance in parallel when a switch is closed to subject it to a sudden constant flow of current. Again, acoustics being an empirical and experimental art, the particular element 26 will have to be specifically developed for a given gasifier. Suffice it to say that a parallel inertia-storage element can be developed to produce a sinusoidal pressure drop 48 when excited by a stepped mass flow. The period of the sinusoidal pressure wave matches that of the stepped mass flow so that the pressure oscillates through one cycle during the discharge time. The maximum amplitude of the pressure wave can be designed to be one-half of the maximum chamber exhaust pressure, $P_{max}$.

Similarly, the parallel inertia-volume element 27 can be tuned to provide two cycles of oscillation during the discharge time and to have a maximum amplitude, one-fourth that of the maximum chamber exhaust pressure, $P_{max}$. The pressure cycle for the second acoustic element 27 is shown by the line 50 in FIGURE 3e.

Since the acoustic elements 24, 26, and 27 are in series with the chamber 14, the pressure at the turbine inlet equals the pressure at the chamber outlet 22 minus the sum of the pressure drops through the various acoustic elements 24, 26, and 27. The pressure profile for the turbine is indicated by the line 52 in FIGURE 3f. Before the exhaust opens, the turbine 36 exhaust to atmosphere. It has no flow and consequently no pressure drop. Therefore, the pressure at the turbine inlet will be atmospheric. As the exhaust 22 opens, the pressure at the turbine inlet is the sum of the chamber exhaust pressure, $P_{max}$, minus the pressure drops through the elements 24, 26, and 27. Since the negative pressure drops have not developed instantaneously, the turbine inlet pressure is at peak chamber exhaust pressure, $P_{max}$, which is indicated at 54. As the negative or opposition pressure drop rapidly develops in the inertia element 24 (FIGURE 3c), the turbine inlet pressure rapidly degenerates to $P_{max}/2$ or the sum of the chamber exhaust pressure ($P_{max}$) and the line inertia pressure ($P_{max}/2$) developed in line 24. Of course, the degeneration will be somewhat aided by the negative pressure drops being more slowly developed in the elements 26 and 27 (FIGURES 3d and 3e) but not appreciably. The point of degeneration to $P_{max}/2$ is indicated at 56.

Similarly by adding the pressures over the remainder of the discharge time, a constant turbine inlet pressure (or pressure drop across the turbine 36 since the outlet is always at atmospheric) results. The turbine inlet pressure at one-half the maximum chamber exhaust pressure, $P_{max}$, is indicated by the horizontal line 58. Finally, as the exhaust port 22 is closed by the piston 16, the pressure drop across the turbine and the mass flow is zero.

Thus having shown the pressure drops which must occur to provide a square wave mass flow and knowing that acoustical elements can be provided to produce these pressure drops, I know that when an exhaust system consisting of these acoustical elements is placed between a gasifier and a turbine, a square wave mass flow and pressure drop across the turbine must result.

Of course, it is to be understood that while I have disclosed a specific embodiment, variations within the scope of my teaching are possible. For instance, I have illustrated two inertia-volume acoustic elements tuned to a fundamental and second harmonic frequency, respectively. Obviously, the number and frequencies of the inertia-volume elements can be varied, the only requirement being that the additive pressure profiles yield a constant pressure drop when placed in series with a gasifier and line inertia element. Also I have illustrated only a single gasifier cylinder. My invention is obviously applicable to a single turbine driven by a number of gasifier cylinders. In such a case, the number of gasifier cylinders could exhaust into the same tuned transmission line or each could have its own tuned exhaust conduit to the turbine. In the case of more than one gasifier, the only requirement is that the discharge times of the gasifiers do not overlap. In this regard, note that the ratio of discharge time to cycle time for each gasifier could be decreased to provide for the additional gasifiers.

I claim:

1. A pulse forming transmission line between a gas producing unit of the type having a combustion chamber with a controlled exhaust orifice that opens and closes at predetermined points in its cycle of operations, said exhaust orifice opening at substantially peak chamber exhaust pressure so that the combustion products are discharged periodically at high temperature and under peak chamber pressure producing successive pulses of gases, and a gas driven machine, said line comprising, in combination, an inertia means tuned to provide rapidly deteriorating pressure drops thereacross when excited by a stepped change in mass flow, said pressure drop being equal and opposite to the force producing the stepped change in mass flow, a plurality of acoustical elements in a series flow relationship with said inertia means, each of said elements consisting of a storage means and an inertia means in a parallel flow relationship tuned to produce a sinusoidal pressure differential thereacross having complete cycles of oscillation for each of said pulses, said acoustical elements having such frequencies and amplitudes that the additive pressures of the elements together with the chamber pressure and the inertia pressure drop at any time during the pulse produces a substantially constant pressure drop across said machine and a stepped substantially constant mass flow through said transmission line and machine.

2. The pulse forming transmission line as defined in claim 1 wherein the first acoustical element in series with said inertia element is tuned to produce a fundamental frequency having one cycle of oscillation for each of said pulses and having an amplitude of one-half the peak cylinder pressure and wherein said remaining acoustical elements are tuned to provide such harmonics of said fundamental frequency and have such amplitudes that the additive pressure of the elements together with the chamber pressure and inertia pressure drop produces a substantially constant pressure drop across the machine during said pulses.

3. The pulse forming transmission line as defined in claim 2 wherein said plurality of acoustical elements consists of two, said second acoustical element being tuned to the second harmonic frequency of said first element and having an amplitude of one-fourth the peak chamber pressure.

4. The pulse forming transmission line as defined in claim 2 wherein said gas producing unit comprises a plurality of chambers, each chamber exhausting at a time during which the remaining chambers have their exhaust orifices closed.

5. The pulse forming transmission line as defined in claim 3 wherein said gas producing unit comprises a plurality of chambers, each chamber exhausting at a time during which the remaining chambers have their exhaust orifices closed.

References Cited

UNITED STATES PATENTS 3,064,417  11/1962  Tryhorn _____ 60—32

FOREIGN PATENTS 131,434   3/1919   Great Britain.
254,280  10/1925  Great Britain.
398,359   9/1933   Great Britain.

MARK M. NEWMAN, *Primary Examiner.*

D. HART, *Assistant Examiner.*